(12) United States Patent
Collins (10) Patent No.: US 11,797,157 B1
(45) Date of Patent: Oct. 24, 2023

(54) SYSTEM AND METHOD FOR PROVIDING EVENTS TO ATTEND, DECISIONS TO MAKE AND A PLATFORM TO CREATE NEW EVENTS

(71) Applicant: Brock Collins, Christiansburg, VA (US)

(72) Inventor: Brock Collins, Christiansburg, VA (US)

(*) Notice: Subject to any disclaimer, the term of this patent is extended or adjusted under 35 U.S.C. 154(b) by 0 days.

(21) Appl. No.: 18/063,182

(22) Filed: Dec. 8, 2022

(51) Int. Cl.
| | | |
|---|---|---|
| *G06F 3/0482* | (2013.01) | |
| *H04L 67/52* | (2022.01) | |
| *H04L 67/51* | (2022.01) | |
| *G06Q 10/1093* | (2023.01) | |

(52) U.S. Cl.
CPC ....... *G06F 3/0482* (2013.01); *G06Q 10/1095* (2013.01); *H04L 67/51* (2022.05); *H04L 67/52* (2022.05)

(58) Field of Classification Search
CPC ................................................ G06F 3/048–05
See application file for complete search history.

(56) References Cited

U.S. PATENT DOCUMENTS

| | | | | |
|---|---|---|---|---|
| 8,001,472 B2* | 8/2011 | Gilley | .................. | A63B 22/02 |
| | | | | 715/834 |
| 8,504,621 B2* | 8/2013 | Ruff | ...................... | G06Q 30/02 |
| | | | | 709/206 |
| 2008/0235214 A1* | 9/2008 | Sandberg | ............ | G06F 16/9537 |
| | | | | 707/999.005 |
| 2009/0307268 A1* | 12/2009 | Chappell | ............. | G06F 3/04842 |
| 2014/0006388 A1 | 1/2014 | Yeskel et al. | | |
| 2015/0039368 A1* | 2/2015 | Polyakov | ............... | G06Q 50/01 |
| | | | | 705/7.19 |
| 2018/0032921 A1* | 2/2018 | Hopper | .................. | G06Q 10/02 |

* cited by examiner

*Primary Examiner* — Daniel Rodriguez
(74) *Attorney, Agent, or Firm* — Patrick J. Stanzione; STANZIONE & ASSOCIATES, PLLC (57) ABSTRACT

A system to provide: a) a randomizer to randomly select where to go for food or where to order food, what to do inside or outside, what sporting event to attend, what movie to go to watch, where people who meet on a dating site can meet for a first date, where users can meet other like-minded users, etc.; b) events for a user to choose from to attend, activities for a user to select from to attend, etc.; and c) a platform for a user to join a membership and create new events for other users to attend, and to choose to receive push notification when a new event has been created, and a method therefor.

21 Claims, 6 Drawing Sheets

SYSTEM AND METHOD FOR PROVIDING EVENTS TO ATTEND, DECISIONS TO MAKE AND A PLATFORM TO CREATE NEW EVENTS

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates to a system to provide events for a user to attend, activities for a user to select and a platform for a user to create new events for others to attend, and a method therefor. More particularly, but not exclusively, this inventive concept relates to a system to provide: a) a randomizer to randomly select where to go for food or where to order food, what to do inside or outside, what sporting event to attend, what movie to go to watch, where people who meet on a dating site can meet for a first date, where users can meet other like-minded users, etc.; b) events for a user to choose from to attend, activities for a user to select from to attend, etc.; and c) a platform for a user to join a membership and create new events for other users to attend, and to choose to receive push notification when a new event has been created, and a method therefor.

Description of the Related Art

Social media provides users, via smart devices (i.e., tablets, smartphones, computers, and any other devices that can access the Internet), to be able to search for activities to attend in their area by typing into their smart devices requests: to display local activities; to search restaurants to attend or to order certain types of food to be delivered or picked up; and to search for local movies in theatres to go to watch. However, a user must type into the smart device the proper sequence of words, and/or the correct words to use in order to obtain accurate responses, in order to find what they are searching for.

US 2014/0006388A1 by Yeskel et al. discloses a system for event searching and suggestion, where the system can determine one or more result events to recommend to attend based on one of: an indication of a location or a computing device associated with a user, and an index associated with the event, where the index is based on event content associated with the event.

EP2917853 A2 by Jyh-Han Lin et al. discloses a social event recommendation system which provides for accessing a plurality of activities that users may attend. This system also includes a recommendation engine, wherein the recommendation(s) includes a plurality of invitees and at least one activity to be attended by the plurality of attendees.

WO 2015/004527 A2 discloses a calendar-event recommendations system that generates and displays event recommendations tailored to a user. This system may recommend events based on a user's current location or a user's social network, such as if the user's friends attend an event, or an event organized by or affiliated with a person, place or organization the user has an interest in. After recommending an event, this system may automatically add the event to the user's calendar, add the user's name to a guest list, and share the event with the user's contacts.

There is a need for a system, routed in computer technology and implemented through the Internet, which can provide a plurality of options for a user to decide from, based on when the user cannot determine themselves: what events they can attend; what food they could order to eat; what locations are convenient to meet up with others using the same system; or which movie they can watch, etc.

There is also a need for system, routed in computer technology and implemented through the Internet, which can provide a randomizer which can randomly choose for a user what event they should attend; what food they should order to eat; what location is convenient and appropriate to meet up with another; or which movie they should attend at a theatre, etc.

There is also a need for a system, routed in computer technology and implemented through the Internet, which can provide a suggestion of events to attend that include like-minded people.

There is also a need for a system, routed in computer technology and implemented through the Internet, which can provide push notifications that inform a user when an event has been created within their specific zip code or specified geographic area, and also provide the option for the user to click on this event to have the event added to the user's calendar as well as signing the user up for this event.

There is also a need for a system, routed in computer technology and implemented through the Internet, which can provide the option for a user to join a membership for a month, for a quarter of a year, annually, etc., and to then create an event through the membership, create an event with push notifications through the membership, and create an event with push notifications and priority event listing through the membership.

SUMMARY OF THE INVENTIVE CONCEPT

The present general inventive concept provides a system to provide events for a user to attend, activities for a user to select and a platform for a user to create new events for others to attend, and a method therefor. More particularly, but not exclusively, this inventive concept relates to a system to provide events for a user to attend, to provide activities for a user to select from and a platform for a user to create new events for others to attend, and a method therefor. More particularly, but not exclusively, this inventive concept relates to a system to provide: a) a randomizer to randomly select where to go for food or where to order food, what to do inside or outside, what sporting event to attend, what movie to go to watch, where other users can conveniently meet up, where people who meet on a dating site can meet for a first date, etc.; b) events for a user to choose from to attend; activities for a user to select from to perform, etc.; and c) a platform for a user to join a membership and create new events for other users to attend, and to choose to receive push notification when a new event has been created, and a method therefor.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system comprising: one or more processors; a graphic user interface (GUI); and a non-transitory computer-readable memory storing computer-readable instructions that, when executed by the one or more processors, cause the system to: receive an input of a desired location of a user; generate and display, on the GUI, prompts for a user to select a first option to randomly provide an activity in the current location to attend within a selected category of activities, to select a second option to search and display events in the current location for a user to attend, and to select a third option for a user to create an event for the current location for other users to join; generate, when a user selects the first option, a randomizer to display a plurality of categories on the GUI, to receive a selection of one of a plurality of displayed categories of activities to attend, to search the Internet for all available activities within the category selected, to store all determined available activities, to shuffle the determined available activities, and to randomly present one of the determined available activities on the GUI; search the Internet, when a user selects the second option, for all events available for a user to attend within the desired location, present all the determined available events on the GUI, and prompt a user to select one of the determined available events to attend; and generate, when a user selects the third option, a GUI to enter predetermined information to create an event for users to attend.

In an exemplary embodiment, the randomizer can further: generate and displays a first prompt to accept the presented activity, a second prompt to restart the shuffle and present a different available activity, and a third prompt to request a display of all determined available activities.

In another exemplary embodiment, if the first prompt is selected, the randomizer will display all determined available activities, if the second prompt is selected, the randomizer will restart the shuffle and present a different available activity, and if the third prompt is selected the randomizer will display all determined available activities.

In another exemplary embodiment, when the second option is selected and one of the determine events to attend is selected, the system can further display information associated with the selected event, enables access to a chat room of the event, sends the user's information and attendance confirmation to the event's website, and enable the user to receive an electronic calendar confirmation of the event.

In still another exemplary embodiment, when the third option is selected, the system can display an option to create a membership and an option to log into the system when a membership already exists.

In still another exemplary embodiment, when the option to create a membership is selected, a GUI can be generated with a first prompt to create an event, a second prompt to create an event and have push notifications sent out, and a third prompt to create an event, have push notifications sent out and enable a user to select priority placement to on the event list.

In yet another exemplary embodiment, when the option to log into the system is selected, a GUI can be generated prompting entry of information corresponding to the event being created, including public or private, a title, picture, description, date and time, categorical keyword, location, and whether the event will be repeating, ability to send to others via email or sms/text.

The foregoing and/or other features and utilities of the present general inventive concept may also be achieved by providing a method comprising: receiving, through a graphic user interface (GUI), an input of a desired location of a user; generating and displaying, on the GUI, prompts for a user to select a first option to randomly provide an activity in the current location to attend within selected categories of activities, to select a second option to search and display events in the current location for a user to attend, and to select a third option for a user to create an event the current location for other users to join; generating, when a user selects the first option, a randomizer to display a plurality of categories on the GUI, to receive a selection of one of a plurality of displayed categories of activities to attend, searching the Internet for all available activities within the category selected, storing all determined available activities in a memory, shuffling the determined available activities, and randomly presenting one of the determined available activities on the GUI; searching the Internet, when a user selects the second option, for all events available for a user to attend within the desired location, date, and/or category presenting all the determined available events on the GUI, and prompting a user to select one of the determined available events to attend; and generating, when a user selects the third option, a GUI to enter predetermined information to create an event for users to attend.

In an exemplary embodiment, the method can further comprise: displaying, when the first option is selected, a first prompt to accept the presented activity, a second prompt to restart the shuffle and present a different available activity, and a third prompt to display all the determined available activities.

In another exemplary embodiment, the method can further comprise: if the first prompt is selected, displaying all determined available activities, if the second prompt is selected, restarting the shuffle and presenting a different available activity, and if the third prompt is selected displaying all determined available activities.

In still another exemplary embodiment, when the second option is selected and one of the determine events to attend is selected, the method can further comprise: displaying information associated with the selected event; enabling access to a chat room of the event; sending the user's information and attendance confirmation to the event's website; and enabling the user to receive an electronic calendar confirmation of the event.

In still another exemplary embodiment, when the third option is selected, the method can display an option to create a membership and an option to log into the system when a membership already exists.

In yet another exemplary embodiment, when the option to create a membership is selected, the method can generate a GUI displaying a first prompt to create an event, a second prompt to create an event and having push notifications sent out, and a third prompt to create an event, have push notifications sent out and enabling a user to select priority placement to on the event list.

In yet another exemplary embodiment, when the option to log into the system is selected, the method can generate and display a GUI prompting entry of information corresponding to the event being created, including public or private, a title, picture, description, date and time, categorical keyword, location, and whether the event will be repeating and the ability to send to others via email or sms/text.

The foregoing and/or other features and utilities of the present general inventive concept may also be achieved by providing a non-transitory computer-readable medium storing computer readable instructions that, when executed, cause one or more computer processors to: receive, through a graphic user interface (GUI), an input of a current location of a user; generate and display, on the GUI, prompts for a user to select a first option to randomly provide an activity in the desired location, date, and/or category to attend within a selected category of activities, to select a second option to search and display events in the current location for a user to attend, and to select a third option for a user to create an event in the current location for other users to join; generate, when a user selects the first option, a randomizer to display a plurality of categories on the GUI, to receive a selection of one of a plurality of displayed categories of activities to attend, to search the Internet for all available activities within the category selected, to store all determined available activities in a memory, to shuffle the determined available activities, and to randomly present one of the determined available activities on the GUI; search the Internet, when a user selects the second option, for all events available for a user to attend within the desired location, date, and/or category present all the determined available events on the GUI, and prompt a user to select one of the determined available events to attend; and generate, when a user selects the third option, a GUI to enter predetermined information to create an event for users to attend.

In an exemplary embodiment, the non-transitory computer-readable medium can further comprise: when the first option is selected, causing the one or more computer processors to display a first prompt to accept the presented activity, a second prompt to restart the shuffle and present a different available activity, and a third prompt to display all the determined available activities.

In another exemplary embodiment, the non-transitory computer-readable medium can further comprise: if the first prompt is selected, causing the one or more computer processors to display all determined available activities, if the second prompt is selected, causing the one or more computer processors to restart the shuffle and present a different available activity, and if the third prompt is selected causing the one or more computer processors to display all determined available activities.

In still another exemplary embodiment, the non-transitory computer-readable medium can further comprise: when the second option is selected and one of the determine events to attend is selected, causing the one or more computer processors to further display information associated with the selected event, enable access to a chat room of the event, send the user's information and attendance confirmation to the event's website, and enable the user to receive an electronic calendar confirmation of the event.

In still another exemplary embodiment, the non-transitory computer-readable medium can further comprise: when the third option is selected, causing the one or more computer processors to display an option to create a membership and an option to log into the system when a membership already exists.

In still another exemplary embodiment, the non-transitory computer-readable medium can further comprise: when the option to create a membership is selected, causing the one or more computer processors to generate a GUI displaying a first prompt to create an event, a second prompt to create an event and have push notifications sent out, and a third prompt to create an event, have push notifications sent out and enable a user to select priority placement to on the event list.

In still another exemplary embodiment, the non-transitory computer-readable medium can further comprise: when the option to log into the system is selected, causing the one or more computer processors to generate a GUI prompting entry of information corresponding to the event being created, including public or private, a title, picture, description, date and time, location, and whether the event will be repeating and the ability to send to others via email or sms/text.

BRIEF DESCRIPTION OF THE DRAWINGS

These and/or other features and utilities of the present inventive concept will become apparent and more readily appreciated from the following description of the embodiments, taken in conjunction with the accompanying drawings of which.

While the drawings illustrate a few example embodiments of the present inventive concept, they are not to be considered limiting in its scope, as the overall inventive concept may admit to other equally effective embodiments. The features shown in the drawings attempt to clearly illustrate the principles of exemplary embodiments of the present inventive concept.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" indicate a unit to process at least one function or operation, wherein the unit may be embodied as hardware or software or embodied by combining hardware and software.

Because the illustrated embodiments of the disclosure may for the most part, be implemented using a computing system and software know to those skilled in the art, details will not be explainer in any greater extent than that considered necessary as illustrated, for the understanding and appreciation of the underlying concepts of the present example embodiments described herein and in order not to obfuscate or distract from the overall inventive concept as described herein.

Any reference in the specification to a method should be applied mutatis mutandis to a system capable of executing the method and should be applied mutatis mutandis to a computer readable medium that is non-transitory and stores process steps for executing the method.

Any reference in the specification to a system should be applied mutatis mutandis to a method that may be executed by the system and should be applied mutatis mutandis to a computer readable medium that is non-transitory and stores process steps for executing the system.

Hereinafter, one or more exemplary embodiments of the present general inventive concept will be described in detail with reference to accompanying drawings.

Example embodiments of the present general inventive concept are directed to a system to provide events for a user to attend, to provide activities for a user to select from and a platform for a user to create new events for others to attend, and a method therefor. More particularly, but not exclusively, the present inventive concept relates to a system to provide: a) a randomizer to randomly select where to go for food or where to order food, what to do inside or outside, what sporting event to attend, what movie to go to watch, where people who meet on a dating site can meet for a first date, where users can meet other like-minded users, etc.; b) events for a user to choose from to attend, activities for a user to select from to attend, etc.; and c) a platform for a user to join a membership and create new events for other users to attend, and to choose to receive push notification when a new event has been created, and a method therefor.

Figure 1:
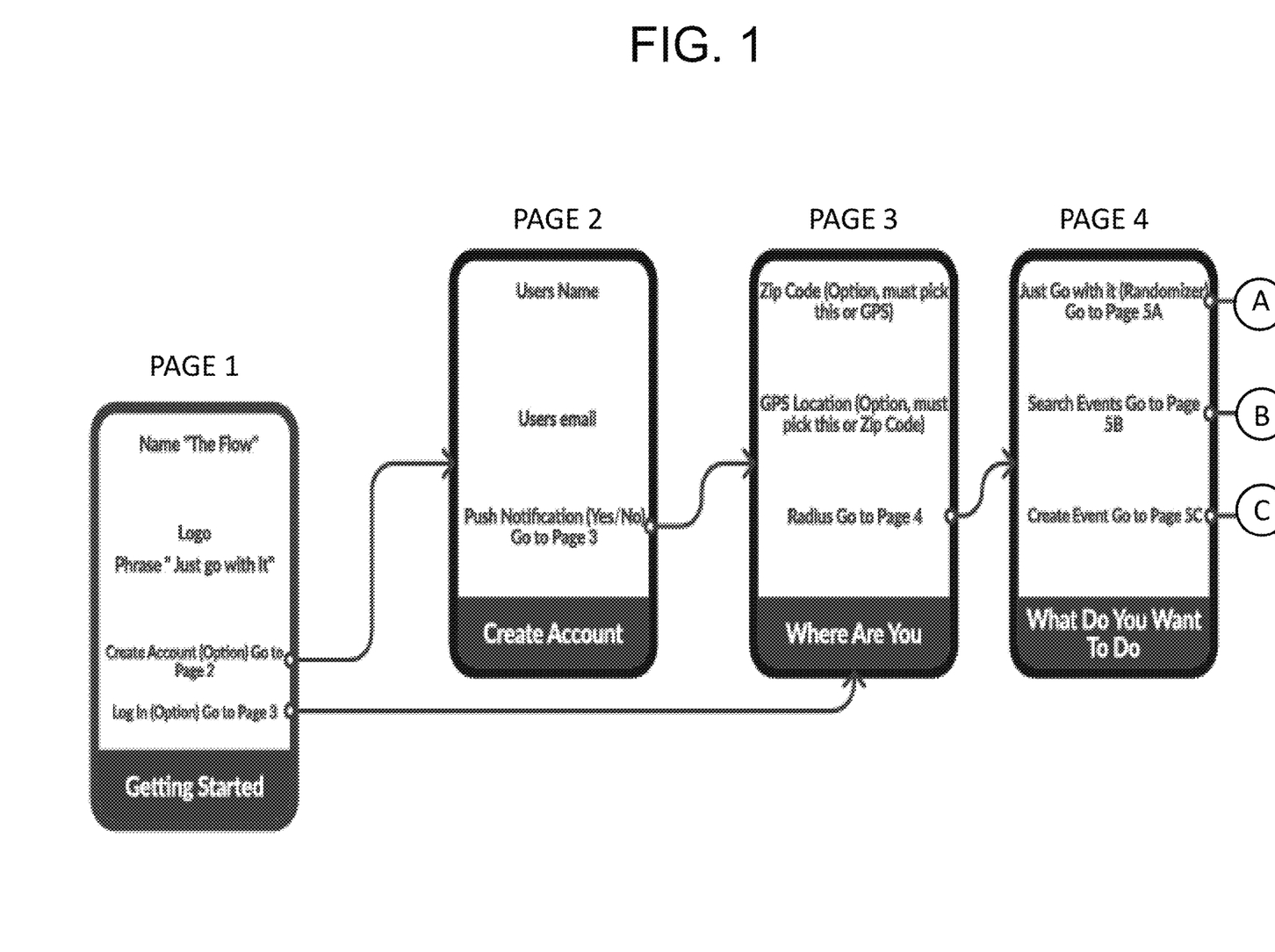
FIG. 1 illustrates four graphic user interface screens of a partial system according to an example embodiment of the present inventive concept.

FIG. 1 illustrates a first set, among a plurality of sets, of graphic user interfaces (GUIs) and process steps of a system according to an example embodiment of the present inventive concept, wherein the system is routed in computer technology and implemented through the Internet. This system is configured to provide a plurality of interactive features and pathways, which are all routed through both specifically programmed computer implemented technology and the Internet. The system can be implemented through a specifically configured computer processing system which is accessible at an interactive display of a user's smart device or by a computing system via the system's website. The computer processing system may include one or more processors connected to at least one memory. The at least one memory may include one or more program modules including executable instructions that, when executed at the one or more processors cause the computer processing system to perform the plurality of interactive features, via a plurality of pathways as described herein.

Referring to FIG. 1, the system according to an example embodiment can first provide a series of graphic user interfaces (GUIs) which are receivable by downloading a corresponding software application (App) on a smart device, such as a smart phone, a tablet, a smart watch, or any other Internet accessible computing device which can access the system via the Internet and/or can download the associated software App, or by accessing the system's website. More specifically, once a user accesses the present inventive system by, for example, the system's corresponding software App or website, the system according to the present inventive concept can first generate and display a PAGE 1 GUI titled: "Getting Started." The PAGE 1 GUI can be displayed on an interactive display screen of the smart device if the system's corresponding software App is downloaded, or can be viewed via the system's website if accessed via the Internet.

The PAGE 1 GUI generated by the system can be configured to present the name and the logo of the system. The PAGE 1 GUI also provides a first option that enables a user to create an account by touching an Icon titled: "Create Account (Option) Go to PAGE 2" of the system (or by clicking on the Icon through the website), and a second option that enables a user to log into the system by touching an Icon titled: "Log In (Option) Go to PAGE 3" of the system (or by clicking on the Icon through the website).

If the user selects the Icon "Create Account (Option) Go to PAGE 2," the system generates a PAGE 2 GUI, titled: "Create Account," which will appear on the display screen of the user's smart device (or on the display of the website). The PAGE 2 GUI will display prompts for the user to enter a "User's Name," a "User's email" address, and an Icon option as to whether the user wants to receive "Push Notifications (Y/N)." Once the prompts presented at PAGE 2 are completed by the user, the system can generate and present a PAGE 3 GUI to be displayed on the user's smart device (or by clicking on the Icon through the website).

If the user selects the option "Log In Go to PAGE 3," the system will directly display the PAGE 3 GUI on the user's smart device (or by clicking on the Icon through the website), which is titled: "Where Are You."

At the PAGE 3 GUI a user is prompted to enter one of two options: a preferred "ZIP Code" of the location of interest; or an acceptance of current "GPS Location". Once one of the above two options are completed by the user the system prompts the user to select an Icon "Radius Go to Page 4." The system will then generate a PAGE 4 GUI, titled: "What Do You Want To Do."

The PAGE 4 GUI provides a user with a plurality of different paths to choose from. Each of these path options, according to the present example embodiment, generates and interactively presents a different series of processes and outcomes for the user. More specifically, a first path option presented for the user to choose is titled: "Just Go with it (Randomizer)," which is a programmed "Randomizer" option. If this option is chosen by the user, the system will generate and display a "PAGE 5A" GUI, titled: "Just Go With It," as illustrated in FIG. 2A and described in more detail below.

Figure 2A:
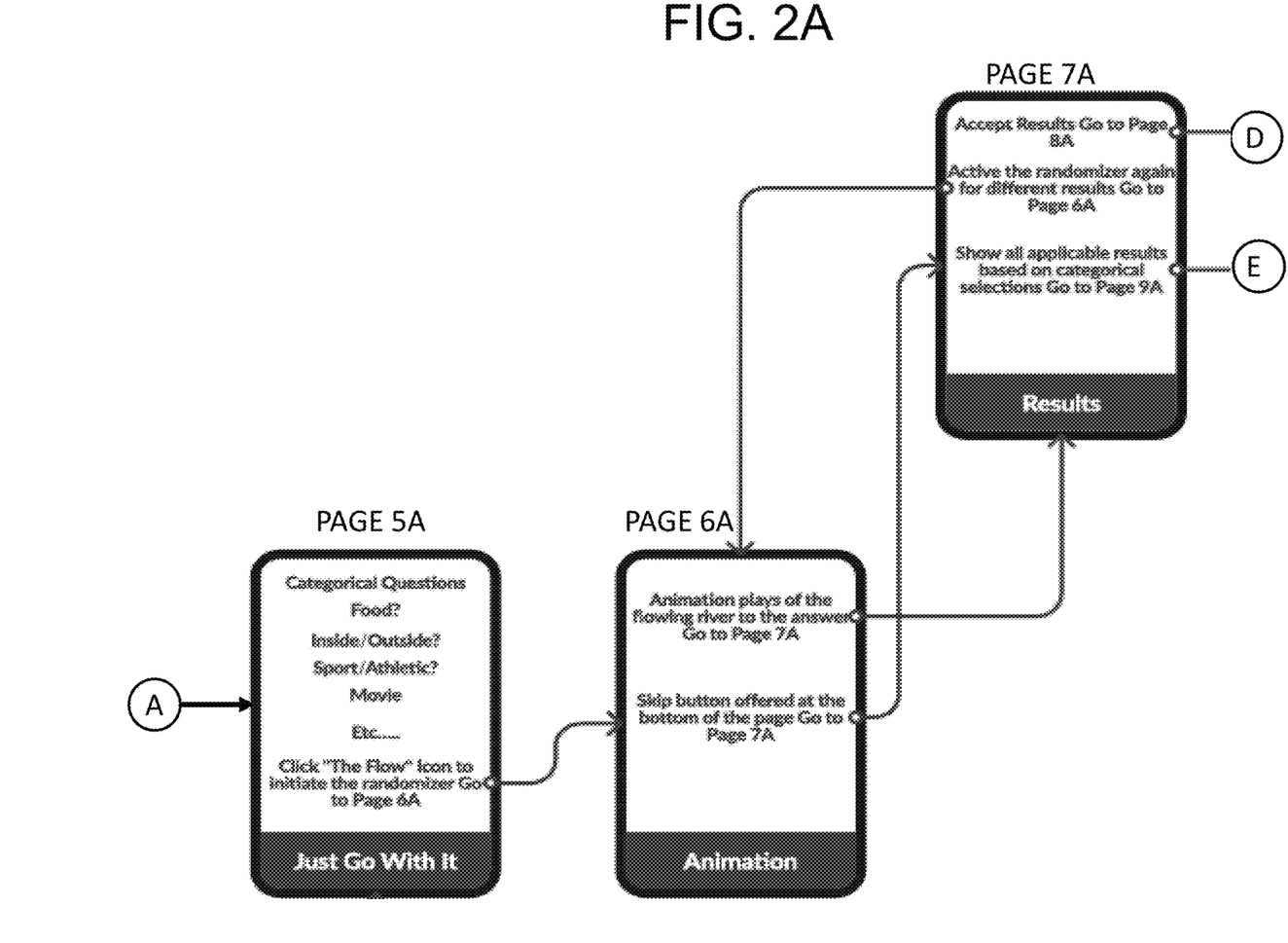
FIG. 2A illustrates three additional graphic user interface screens of a partial system according to an example embodiment of the present inventive concept.

Referring to FIG. 2A, the PAGE 5A GUI displays different categories for a user to choose from on the interactive screen of the smart device. It is to be noted that although PAGE 5A illustrates a specific list of categories for a user to choose from, the present illustrated list of categories is not limited to only these categories, but may include additional categories, as well as alternative categories, without departing from the spirit and scope of the overall inventive concept. The categories on the PAGE 5A GUI are presented for a user to choose from depending on what the user is interested in doing at the present time. For example, the user may want to eat, or may want to go somewhere outside or inside, depending on the weather or time of day/night, or may want to attend a sporting/athletic event, or may want to attend a movie, etc. Once the user selects one of the categories by selecting from a list of dropdowns, either via the app or the website, the user can then click on a tap labeled "The Flow" on PAGE 5A, a specifically configured randomizer engine will be initiated, which can randomly shuffle through hundreds or thousands of options available within the selected category through the Internet, which is confined within the Zip Code or GPS location which was previously selected by the user (see FIG. 1 at PAGE 3). The randomizer will then select one option from all of the options found and provide the selected option to the user on the GUI. For example, if the user chooses the category "Movie," the randomizer can search all possible movie options available on the Internet within the Zip Code or GPS location previously entered by the user at PAGE 3. While the randomizer is searching for an answer a PAGE 6A GUI will be displayed, titled: "Animation," which is programmed to show a flowing river leading to the answer. The Randomizer will eventually present the selected answer on the user's display (or on the system's website). Once the answer is automatically selected by the randomizer the system will display a PAGE 7A GUI, titled: "Results," with the answer. The PAGE 6A GUI will also provide an Icon option to "Skip" the flowing river and go directly to the PAGE 7A GUI.

At the PAGE 7A GUI the randomizer will present an answer, such as, for example "Gone With The Wind" playing at a "Theatre X," which will be within the Zip code OR GPS location entered. PAGE 7A GUI will provide the randomized answer on the top of the page and will also provide three options regarding the answer presented to the user below the answer. The first option is to touch the Icon "Accept Results Go to Page 8A," the second option is to touch the Icon "Activate the randomizer again for different results," and the third option is to touch the Icon "Show all applicable results based on categorical selections Go to Page 9A." As pointed out above, if accessing the present inventive system via the system's website, then the user will click on the respective Icons using a mouse or other interactive device.

Figure 2B:
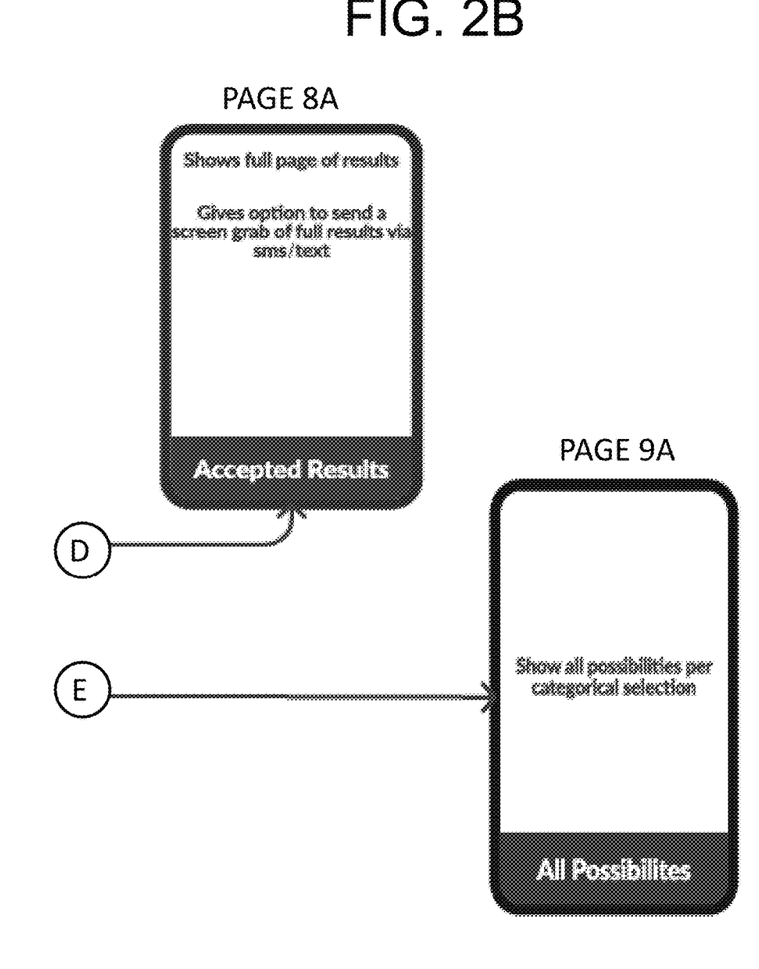
FIG. 2B illustrates two additional graphic user interface screens of a partial system according to an example embodiment of the present inventive concept.

If the user touches the Icon "Accept Results Go to Page 8A," the GUI will display PAGE 8A, titled: "Accepted Results," as illustrated in FIG. 2B. The results are shown as they would be if sent to another person and the user has the option of: "Gives option to send a screen grab of full results via sms/text." If the user elects to click on the aforementioned option, the system will bring up a text message/SMS with the results pre-loaded into the message that can be sent to another user's smart device via sms/text.

Referring back to FIG. 2A, if the user touches the Icon "Activate the randomizer again for different results" on the PAGE 7A GUI, the system will return to PAGE 6A, where the randomizer will again be activated to randomly shuffle through hundreds or thousands of options available within the selected category through the Internet, wherein, as pointed out above, the number of options available will depend on the Zip Code, GPS location or Radius earlier entered by the user. The randomizer will then select one option from all the options found and provide the selected option to the user on the display screen of the user's smart device. The user will then prompted once again to touch (or click if accessing the system via the system's website) the interactive display screen over the words "Go to Page 7A." This routine can continue repeatedly until the user decides to accept the results provided by the randomizer, at which point the user can touch the Icon "Accept Results Go to page 8A," or the user can touch the Icon "Show all applicable results based on categorical selections Go to Page 9A."

If the user touches the second option "Show all applicable results based on categorical selections Go to Page 9A," the system will display the PAGE 9A GUI, as illustrated in FIG. 2B, and will show all possibilities of the categories selected by the user. By selecting this option the user will be presented with all options discovered by the Randomizer, sorted out by category.

Figure 3:
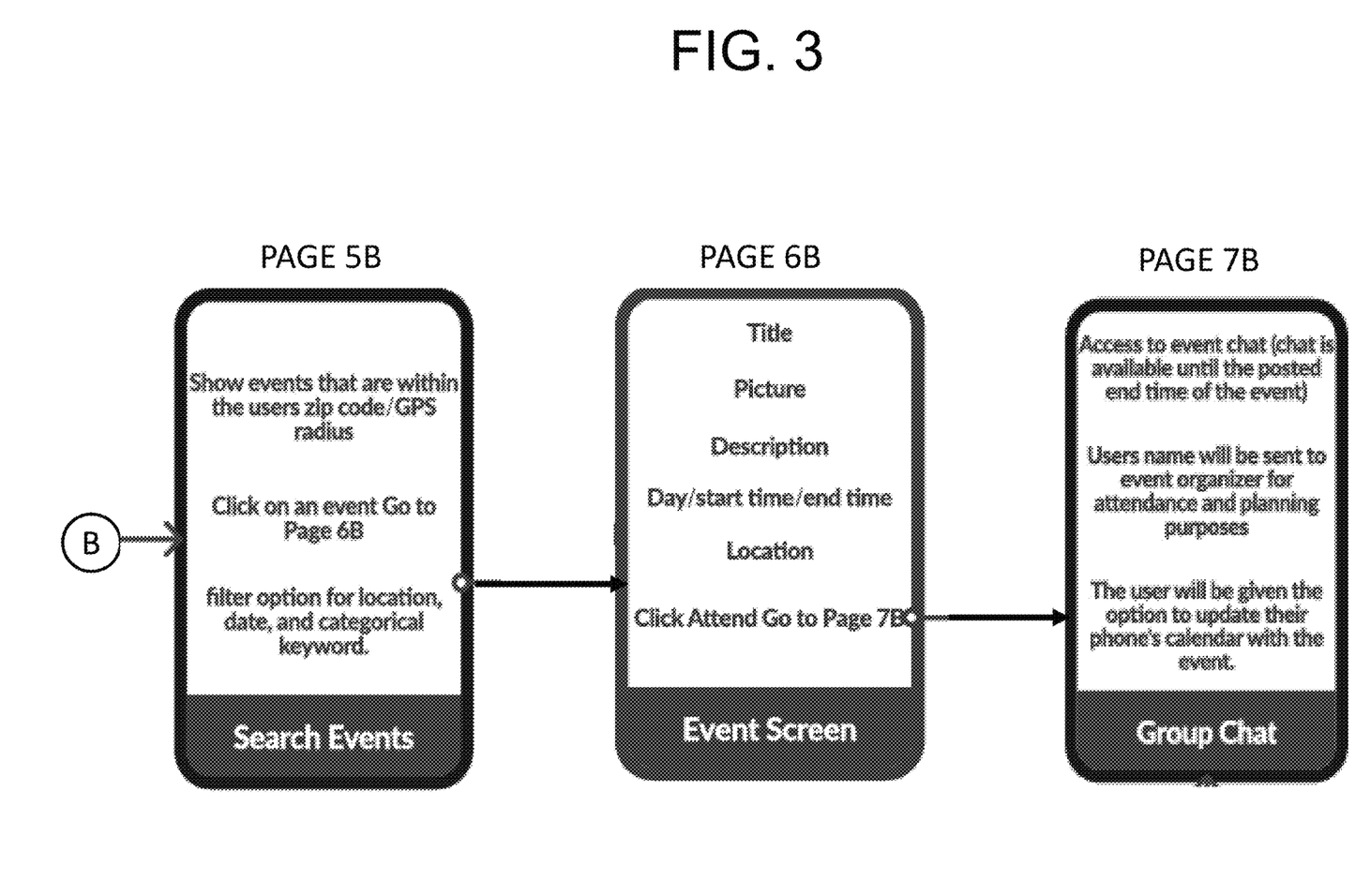
FIG. 3 illustrates three additional graphic user interface screens of a partial system according to an example embodiment of the present inventive concept.

Referring back to FIG. 1, if the user decides not to select the randomizer option, the user can select the Icon "Search Events Go to Page 5B." In this case the GUI will display PAGE 5B, as illustrated in FIG. 3. PAGE 5B is titled: "Search Events," and will have a filter on the top of the page that can be queried by location, date, and categorical keyword (matches keyword used when creating events). Initial results on 5B will be derived from the initial GPS or Zip code and radius provided by the user.

The user can then touch the event in which the user decides to attend, at which point the system will collect all the information associated with the event selected by the user, and then display PAGE 6B. The PAGE 6B GUI is titled: "Event Screen," and can display all of the information associated with the event selected, such as, but not limited to the title of the event, a picture of the event, a more detailed description of the event, the day, start time and end time of the event, and the location of the event. PAGE 6B also can display a SHARE Icon that allows the user to send the event via sms/text to another user. PAGE 6B also can display an Icon "Click Attend Go to Page 7B." Once the Icon "Click Attend Go to Page 7B" is selected (touched) by the user, the system will enable three interactive processes and display PAGE 7B, titled: "Group Chat." Once at PAGE 7B, the GUI can display on the screen access to the event chat room, and the system will also send the user's name to the event organizer for attendance and planning purposes as well as providing the user with an option to update their electronic calendar with the event information that will present as a pop-up feature.

Figure 4A:
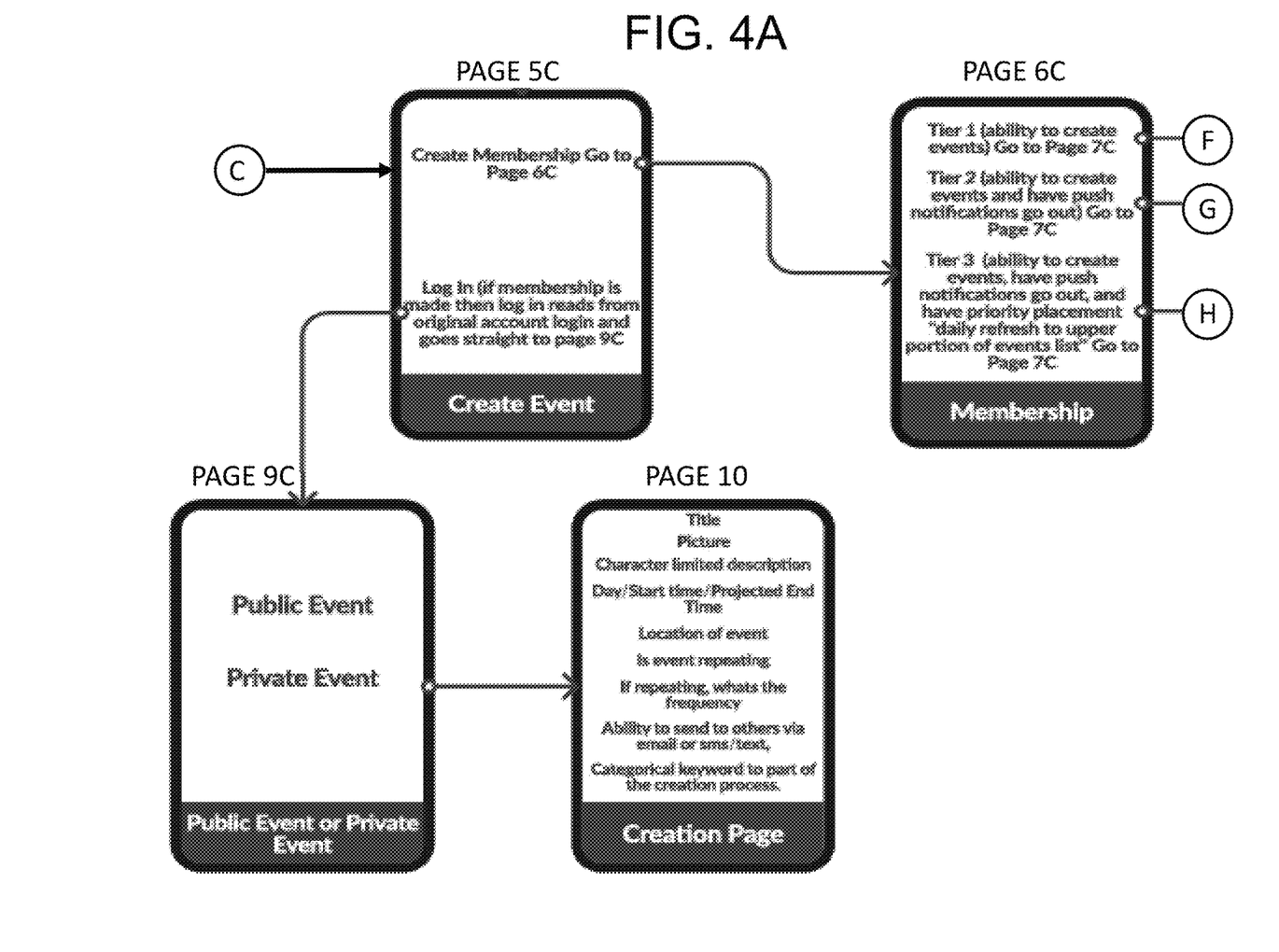
FIG. 4A illustrates three additional graphic user interface screens of a partial system according to an example embodiment of the present inventive concept.
Figure 4B:
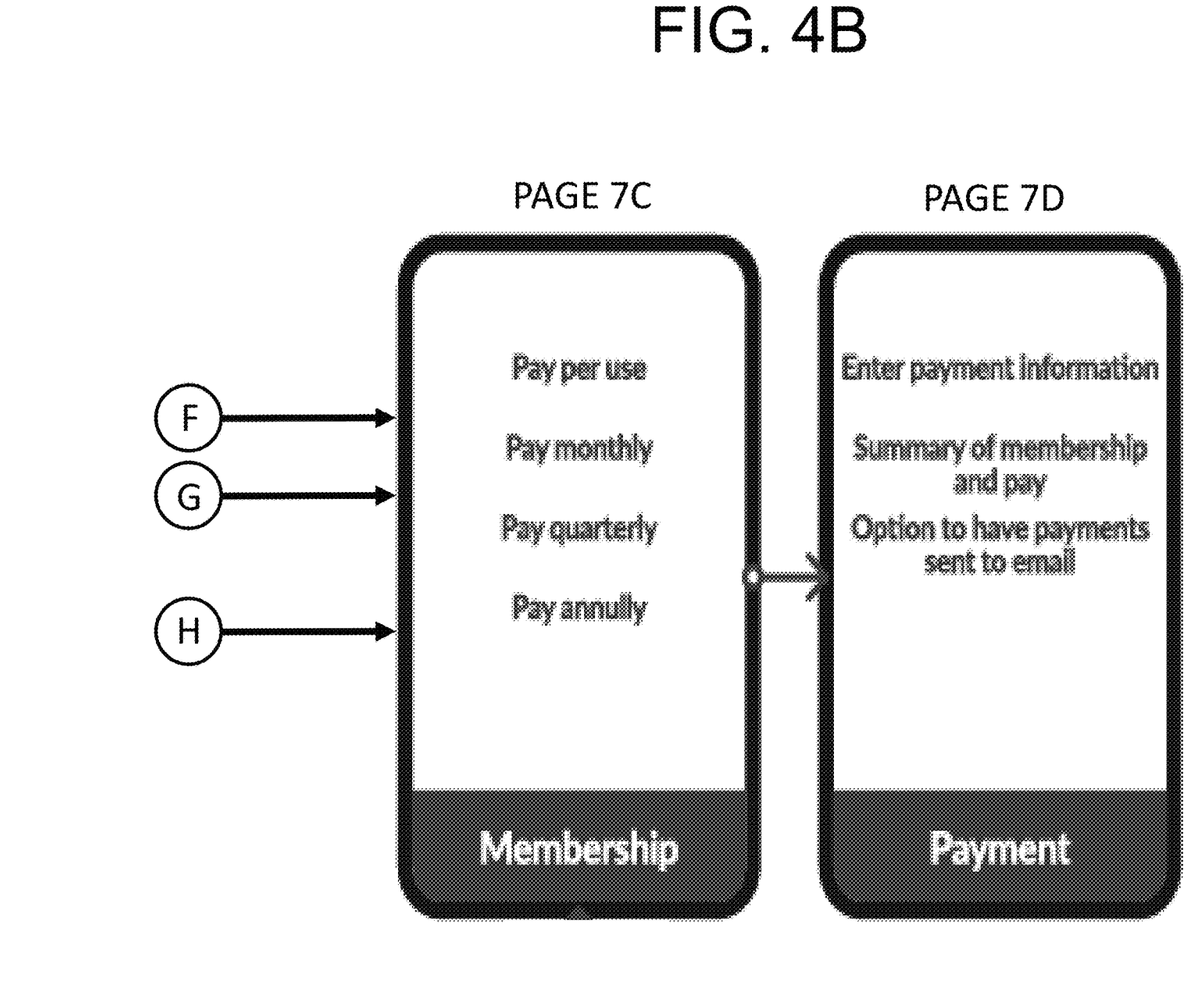
FIG. 4B illustrates two additional graphic user interface screens of a partial system according to an example embodiment of the present inventive concept.

Referring back to FIG. 1, if the user decides not to select the Icon "Randomizer" or the Icon "Search Events Go to Page 5B," the user can select the third Icon "Create Event Go to Page 5C." If this Icon is selected (touched) by the user, the system will display a PAGE 5C GUI titled: "Create Event," as illustrated in FIG. 4A. The PAGE 5C GUI enables the user to create a membership if one is not already created for the user. In this case the user will select an Icon "Create Membership Go to Page 6C." The system will then display the PAGE 6C GUI on the display screen, which is titled: "Membership." At PAGE 6C three Icon options can be provided to the user: 1) Tier 1, which informs and enables the user to create events; 2) Tier 2, which informs and enables the user to create events and have push notifications go out; and 3) Tier 3, which informs the and enables the user to create events, have push notifications go out, and have priority placement "daily refresh to upper portion of events list." If any of these three Icons are selected by the user, the system will display a PAGE 7C GUI on the display screen of the user's smart device, as illustrated in FIG. 4B.

At the PAGE 7C GUI the system will enable the user to choose which payment option to choose including, but not limited to a single "Pay per use," a "Pay monthly," a "Pay quarterly," or a "Pay annually." Once the user chooses one of the payment options the system will display a GUI with an Icon "Payment." The Payment GUI will prompt the user to enter their payment information. The Payment GUI will also include an Icon for the user to send receipt, which can be titled: "Summary of Membership and pay." This Icon, if selected (touched) will confirm and send the payment for the Payment option selected. The Payment GUI will also include an Icon for the user to choose whether they would like to have the completed payments sent to their email, which can be titled: "Option to have receipts sent to email." If this Icon is selected (touched) the user will receive payment confirmation emails each time a payment is charged to the user's choice of payment information. For example, if the user selects the "Pay monthly" payment option, the user will receive an email each month notifying the user that payment for the new month has been completed. Similar emails will be sent for quarterly and annual payment options.

Referring back to FIG. 4A, if the user already has a membership with the system when the user reaches the PAGE 5C GUI, the user can select an Icon titled: "Log In," which will cause the system to display a PAGE 9C GUI, titled: "Public Event or Private Event". Here the user can decide whether their event will be a public event, viewed by all users, or a private event, only viewed by those who the creator invites. Upon choosing public or private this will cause the system to display PAGE 10 GUI, titled: "Creation Page." Here the user can go straight to creating a new event by entering the prompted inputs. The prompted inputs can include, but are not limited to a Title of the event, a Picture representing the event, a Character limited description of the event, a Day/Start Time/Projected End Time of the event, categorical keyword, a Location of the event, an input as to whether the event will be repeating on a regular basis, and if repeating, an input as to the frequency of repeating of the event. The user will have the ability to send their event via email or sms/text to others.

The present general inventive concept can be embodied as computer-readable codes on a non-transient computer-readable medium. The non-transient computer-readable medium can include a computer-readable recording medium and a computer-readable transmission medium. The computer-readable recording medium is any data storage device that can store data as a program which can be thereafter read by a specifically configured computer processing system. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system comprising:
one or more processors;
a graphic user interface (GUI); and
a non-transitory computer-readable memory storing computer-readable instructions that, when executed by the one or more processors, cause the system to:
receive an input of a desired location of a user;
generate and display, on the GUI, prompts for a user to select a first option to randomly provide an activity in the desired location to attend within a selected category of activities, to select a second option to search and display events in the desired location for a user to attend, and to select a third option for a user to create an event for the desired location for other users to join;
generate, when a user selects the first option, a randomizer to display a plurality of categories on the GUI, to receive a selection of one of a plurality of displayed categories of activities to attend, to search the Internet for all available activities within the category selected, to store all determined available activities, to shuffle the determined available activities, and to randomly present one of the determined available activities on the GUI;
search the Internet, when a user selects the second option, to determine all events available for a user to attend within the desired location, present all the determined available events on the GUI, and prompt a user to select one of the determined available events to attend; and
generate, when a user selects the third option, a GUI to enter predetermined information to create an event for users to attend.

2. The system according to claim 1, wherein the randomizer further:
generates and displays a first prompt to accept the presented activity, a second prompt to restart the shuffle and present a different available activity, and a third prompt to request a display of all determined available activities.

3. The system according to claim 2, wherein:
if the first prompt is selected, the randomizer will display all determined available activities,
if the second prompt is selected, the randomizer will restart the shuffle and present a different available activity, and
if the third prompt is selected the randomizer will display all determined available activities.

4. The system according to claim 1, wherein when the second option is selected and one of the determine events to attend is selected, the system further displays information associated with the selected event, enables access to a chat room of the event, sends the user's information and attendance confirmation to the event's website, and enables the user to receive an electronic calendar confirmation of the event.

5. The system according to claim 1, wherein when the third option is selected, the system displays an option to create a membership and an option to log into the system when a membership already exists.

6. The system according to claim 5, wherein when the option to create a membership is selected, a GUI is generated with a first prompt to create an event, a second prompt to create an event and have push notifications sent out, and a third prompt to create an event, have push notifications sent out and enable a user to select priority placement on the event list.

7. The system according to claim 5, wherein when the option to log into the system is selected, a GUI is generated prompting entry of information corresponding to the event being created, including public or private, a title, picture, description, date and time, categorical keyword, location, and whether the event will be repeating, ability to send to others via email or sms/text.

8. A method comprising:
receiving, through a graphic user interface (GUI), an input of a desired location of a user;
generating and displaying, on the GUI, prompts for a user to select a first option to randomly provide an activity in the desired location to attend within selected categories of activities, to select a second option to search and display events in the desired location for a user to attend, and to select a third option for a user to create an event in the desired location for other users to join;
generating, when a user selects the first option, a randomizer to display a plurality of categories on the GUI, to receive a selection of one of a plurality of displayed categories of activities to attend, searching the Internet for all available activities within the category selected, storing all determined available activities in a memory, shuffling the determined available activities, and randomly presenting one of the determined available activities on the GUI;
searching the Internet, when a user selects the second option, to determine all available events for a user to attend within the desired location, a date, and/or a category presenting all the determined available events on the GUI, and prompting a user to select one of the determined available events to attend; and
generating, when a user selects the third option, a GUI to enter predetermined information to create an event for users to attend.

9. The method according to claim 8, further comprising:
displaying, when the first option is selected, a first prompt to accept the presented activity, a second prompt to restart the shuffle and present a different available activity, and a third prompt to display all the determined available activities.

10. The method according to claim 9, wherein:
if the first prompt is selected, displaying all determined available activities,
if the second prompt is selected, restarting the shuffle and presenting a different available activity, and
if the third prompt is selected displaying all determined available activities.

11. The method according to claim 8, wherein when the second option is selected and one of the determine events to attend is selected, further comprising:

displaying information associated with the selected event;
enabling access to a chat room of the event;
sending the user's information and attendance confirmation to the event's website, and
enabling the user to receive an electronic calendar confirmation of the event.

12. The method according to claim 8, wherein when the third option is selected, displaying an option to create a membership and an option to log into the system when a membership already exists.

13. The method according to claim 12, wherein when the option to create a membership is selected, generating a GUI displaying a first prompt to create an event, a second prompt to create an event and having push notifications sent out, and a third prompt to create an event, have push notifications sent out and enabling a user to select priority placement on the event list.

14. The method according to claim 12, wherein when the option to log into the system is selected, generating and displaying a GUI prompting entry of information corresponding to the event being created, including public or private, a title, picture, description, date and time, categorical keyword, location, and whether the event will be repeating and the ability to send to others via email or sms/text.

15. A non-transitory computer-readable medium storing computer readable instructions that, when executed, cause one or more computer processors to:
receive, through a graphic user interface (GUI), an input of a desired location of a user;
generate and display, on the GUI, prompts for a user to select a first option to randomly provide an activity in the desired location, date, and/or category to attend within a selected category of activities, to select a second option to search and display events in the desired location for a user to attend, and to select a third option for a user to create an event in the current location for other users to join;
generate, when a user selects the first option, a randomizer to display a plurality of categories on the GUI, to receive a selection of one of a plurality of displayed categories of activities to attend, to search the Internet for all available activities within the category selected, to store all determined available activities in a memory, to shuffle the determined available activities, and to randomly present one of the determined available activities on the GUI;
search the Internet, when a user selects the second option, to determine all available events for a user to attend within the desired location, date, and/or category present all the determined available events on the GUI, and prompt a user to select one of the determined available events to attend; and
generate, when a user selects the third option, a GUI to enter predetermined information to create an event for users to attend.

16. The non-transitory computer-readable medium according to claim 15, further comprising:
when the first option is selected, causing the one or more computer processors to display a first prompt to accept the presented activity, a second prompt to restart the shuffle and present a different available activity, and a third prompt to display all the determined available activities.

17. The non-transitory computer-readable medium according to claim 16, further comprising:

if the first prompt is selected, causing the one or more computer processors to display all determined available activities, if the second prompt is selected, causing the one or more computer processors to restart the shuffle and present a different available activity, and if the third prompt is selected causing the one or more computer processors to display all determined available activities.

18. The non-transitory computer-readable medium according to claim 15, further comprising:

wherein when the second option is selected and one of the determine events to attend is selected, causing the one or more computer processors to further display information associated with the selected event, enable access to a chat room of the event, send the user's information and attendance confirmation to the event's website, and enable the user to receive an electronic calendar confirmation of the event.

19. The non-transitory computer-readable medium according to claim 15, wherein when the third option is selected, causing the one or more computer processors to display an option to create a membership and an option to log into the system when a membership already exists.

20. The non-transitory computer-readable medium according to claim 19, wherein when the option to create a membership is selected, causing the one or more computer processors to generate a GUI displaying a first prompt to create an event, a second prompt to create an event and have push notifications sent out, and a third prompt to create an event, have push notifications sent out and enable a user to select priority placement on the event list.

21. The non-transitory computer-readable medium according to claim 19, wherein when the option to log into the system is selected, causing the one or more computer processors to generate a GUI prompting entry of information corresponding to the event being created, including public or private, a title, picture, description, date and time, location, and whether the event will be repeating and the ability to send to others via email or sms/text.

\* \* \* \* \*